(12) United States Patent
Glück et al.

(10) Patent No.: US 9,283,912 B2
(45) Date of Patent: Mar. 15, 2016

(54) AIRBAG CONTROL UNIT

(71) Applicant: Zodiac Cabin Controls GmbH, Hamburg (DE)

(72) Inventors: Susanne Glück, Huntington Beach, CA (US); Sara Hoya Arija, Hamburg (DE); Stefan Röschl, Hamburg (DE); Jonas Pohl, Pinneberg (DE)

(73) Assignee: Zodiac Cabin Controls Gmbh, Hamburg (DE)

( * ) Notice: Subject to any disclaimer, the term of this patent is extended or adjusted under 35 U.S.C. 154(b) by 0 days.

(21) Appl. No.: 14/317,702

(22) Filed: Jun. 27, 2014

(65) Prior Publication Data

US 2015/0001837 A1    Jan. 1, 2015

Related U.S. Application Data

(60) Provisional application No. 61/839,921, filed on Jun. 27, 2013.

(51) Int. Cl.
*B60R 21/017* (2006.01)
*B60R 21/015* (2006.01)
*B60R 21/0132* (2006.01)
*B60R 21/01* (2006.01)

(52) U.S. Cl.
CPC ......... *B60R 21/017* (2013.01); *B60R 21/01336* (2014.12); *B60R 21/01558* (2014.10); *B60R 2021/01047* (2013.01)

(58) Field of Classification Search
CPC .. B60R 21/01; B60R 21/013; B60R 21/0133; B60R 21/01332; B60R 21/01336; B60R 21/0136; B60R 21/01558; B60R 21/0156; B60R 21/0104; B60R 21/01047
See application file for complete search history.

(56) References Cited

U.S. PATENT DOCUMENTS

| 4,851,705 | A | * | 7/1989 | Musser et al. | 307/10.1 |
|---|---|---|---|---|---|
| 4,958,851 | A | * | 9/1990 | Behr et al. | 280/735 |
| 5,085,464 | A | * | 2/1992 | Behr et al. | 280/735 |
| 5,187,389 | A | * | 2/1993 | Hall et al. | 327/50 |
| 5,957,988 | A | * | 9/1999 | Osajda et al. | 701/45 |
| 6,329,914 | B1 | * | 12/2001 | Shieh et al. | 340/561 |
| 2004/0199318 | A1 | * | 10/2004 | Shieh et al. | 701/45 |
| 2005/0096881 | A1 | * | 5/2005 | Watson et al. | 702/190 |
| 2007/0055429 | A1 | * | 3/2007 | Komaki et al. | 701/45 |
| 2007/0118312 | A1 | * | 5/2007 | Cech et al. | 702/65 |
| 2014/0132418 | A1 | * | 5/2014 | Lill et al. | 340/679 |

* cited by examiner

*Primary Examiner* — Drew Brown
(74) *Attorney, Agent, or Firm* — Kilpatrick Townsend & Stockton LLP; Dean W. Russell, Esq.; Matthew T. Kitces, Esq.

(57) ABSTRACT

An airbag control unit including two, independent trigger control paths that operate sets of first and second switches placed in series with a power source, sets of trigger outputs, and a ground. Each trigger control path is capable of detecting a shock and determining if the shock is a crash-level shock. Each trigger control path outputs a trigger signal to a switch when a crash-level shock is detected and the trigger control path is armed. Current is only supplied to the trigger output if both trigger control paths sense a crash-level shock and are armed. Upon sensing a shock, each trigger control path can power a power hold element that provides temporary power to the trigger control paths long enough to process the shock signals and generate any necessary trigger signals.

20 Claims, 4 Drawing Sheets

AIRBAG CONTROL UNIT

CROSS REFERENCE TO RELATED APPLICATIONS

The present application claims the benefit of U.S. Provisional Application No. 61/839,921 filed Jun. 27, 2013 entitled "Airbag Control Unit," which is hereby incorporated by reference in its entirety.

TECHNICAL FIELD

The present disclosure relates to vehicle safety devices generally and more specifically to crash detection and airbag deployment.

BACKGROUND

Airbags are used in many industries, often in vehicles, to prevent injury during impacts. Airbags are generally powered by inflators, such as gas inflators, that are triggered from an electronic airbag control unit. The airbag control unit is responsible for determining if a crash has occurred and if airbags should be deployed. Airbag control units must be capable of discerning between crash-level shocks needing airbag deployment and uncritical shocks for which airbag deployment is not desired.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Embodiments of the present invention include an airbag control unit including two, independent trigger control paths that operate switches placed in series with a power source and a trigger output. In some embodiments, the two independent trigger control paths operate four sets of first switches and second switches, each set associated with a trigger output that is itself associated with an airbag. Other numbers of switches, trigger outputs, and airbags can be used. Each trigger control path is capable of detecting a shock and determining if the shock is a crash-level shock. Each trigger control path outputs a trigger signal to a switch when a crash-level shock is detected and the trigger control path is armed. Current is only supplied to a trigger output if both trigger control paths sense a crash-level shock and are armed. Upon sensing a shock, each trigger control path can power a power hold element that provides temporary power to the trigger control paths long enough to process the shock signals and generate any necessary trigger signals.

BRIEF DESCRIPTION OF THE DRAWINGS

The specification makes reference to the following appended figures, in which use of like reference numerals in different figures is intended to illustrate like or analogous components

DETAILED DESCRIPTION

Figure 1:
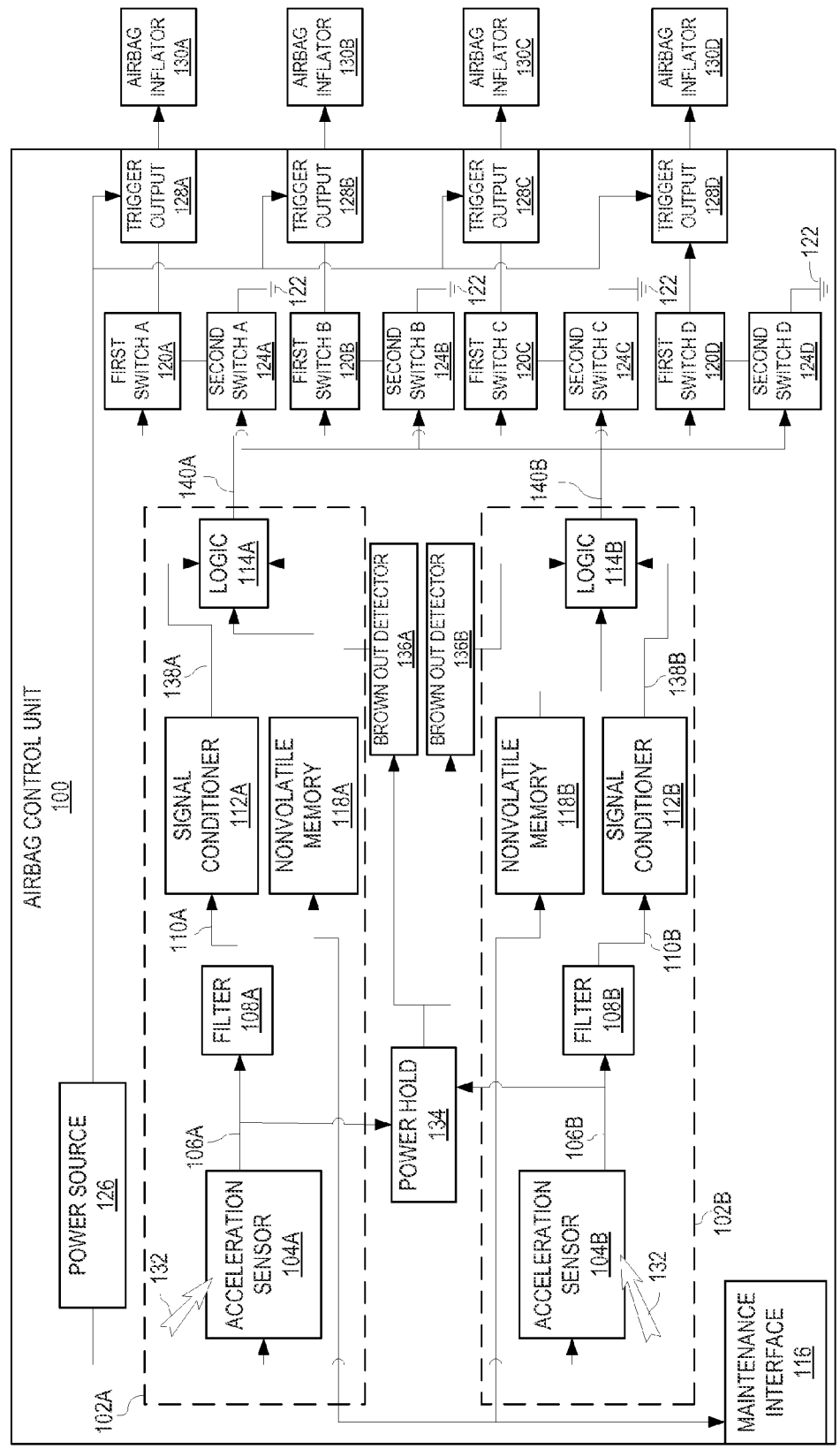
FIG. 1 is a schematic diagram depicting an airbag control unit according to certain embodiments of the present disclosure.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain aspects and features of the present disclosure relate to an airbag control unit including two, independent trigger control paths that operate, for each trigger output of the airbag control unit, a set of two switches that enable a trigger output to output power to an airbag from a power source. In some embodiments, a single set of switches can enable one or more trigger outputs to output power to one or more airbags. Each trigger control path is capable of detecting a shock and determining if the shock is a crash-level shock. Each trigger control path outputs a trigger signal to a switch when a crash-level shock is detected and the trigger control path is armed. Current is only supplied to the trigger output if both trigger control paths sense a crash-level shock and are armed. Upon sensing a shock, each trigger control path can power a power hold element that provides temporary power to the trigger control paths long enough to process the shock signals and generate any necessary trigger signals.

An airbag control unit (ACU) can be used to detect and evaluate crash pulses and to provide inflation signals to connected airbag inflators. The ACU can be part of a mounted airbag system in a vehicle, such as an aircraft. Vehicle acceleration can be evaluated by an acceleration sensor, such as a shock switch. Shock signals from the acceleration sensor can be filtered by electronic hardware to distinguish between a real crash situation and an uncritical shock. Redundant acceleration sensors and filters can be employed to avoid inadvertent airbag deployment.

In the case of a crash event, the acceleration sensors can provide trigger signals to one or more outputs of the ACU. These outputs can be connected to airbag inflators, such as gas inflators. When the airbag inflators receive trigger signals, the airbag inflators cause the airbag to inflate.

Power can be supplied to the ACU by an integrated battery. The supplied power can be switched to the control circuit only in the case of a shock event. An integrated buffer can be used to provide power until signal evaluation is complete.

An enable/disable mechanism can be used to enable or disable airbag activation, such as for maintenance purposes. A maintenance connector can provide information on battery status or other statuses of the ACU. The maintenance connector can allow for airbag deployment to be enabled or disabled. An open circuit detector can detect whether an open circuit exists in the path to and from a connected inflator, including its connection cable.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is a schematic diagram depicting an airbag control unit 100 according to certain embodiments of the present disclosure. The airbag control unit 100 includes two trigger control paths 102A, 102B. The first trigger control path 102A includes a first acceleration sensor 104A. The second trigger control path 102B includes a second acceleration sensor 104B. For the purposes of explanation below, only the elements in the first trigger control path 102A will be described in full. The function of every element in the second trigger control path 102B is functionally equivalent to the respective, mirrored element in the first trigger control path 102A. In other words, descriptions of the first acceleration sensor 104A are equally applicable to the second acceleration sensor 104B. Additionally, descriptions of any interactions between the first acceleration sensor 104A and another element in the first trigger control path 102A are equally applicable to interactions between the second acceleration sensor 104B and corresponding elements in the second trigger control path 102B.

The first acceleration sensor 104A can be a shock switch or other suitable device for measuring aircraft acceleration, such as a shock 132. When the first acceleration sensor 104A detects an acceleration above a set limit, the first acceleration sensor 104A provides a first shock signal 106A to first filter 108A. When the first acceleration sensor 104A is a shock switch, detection of an acceleration above a set limit closes the circuit between the power source 126 the first filter 108A. The power source 126 can be any suitable power source, such as a battery. The power source 126 can be multiple (e.g., two) lithium ion batteries placed in series to provide a high current power pulse to the airbag trigger outputs 128A, 128B, 128C, 128D.

The first filter 108A is an electronic low-pass filter. The first filter 108A can distinguish between non-crash pulses and longer crash conditions. The first filter 108A outputs a first filtered signal 110A to a first signal conditioner 112A. The first signal conditioner 112A conditions the first filtered signal 110A to ensure precise switching of the trigger outputs 128A, 128B, 128C, 128D to the airbag inflators 130A, 130B, 130C, 130D. The first signal conditioner 112A also functions to output a first conditioned signal 138A for sufficient duration, despite the duration of the first filtered signal 110A (e.g., signal hold). The sufficient duration can be long enough to ensure one or all of the airbag inflators 130A, 130B, 130C, 130D is properly triggered. The first signal conditioner 112A provides a first conditioned signal 138A to first logic element 114A, described in further detail below.

First nonvolatile memory 118A can save information regarding the status of the airbag control unit 100. The first nonvolatile memory 118A is designed to retain stored information even if no power is supplied thereto. In some embodiments, the first nonvolatile memory 118A can store a first armed status of the airbag control unit 100, which is a setting for whether or not the airbag control unit 100 will send inflation signals upon detecting a shock 132 that is a sufficient shock (e.g., crash-level shock). If the armed status of the airbag control unit 100 is enabled, the airbag control unit 100 will send inflation signals upon detection of a shock 132 that is a sufficient shock (e.g., crash-level shock). If the armed status of the airbag control unit 100 is disabled, the airbag control unit 100 will not send inflation signals, regardless of whether a shock 132 that was a sufficient shock (e.g., crash-level shock) was detected. In some embodiments, the first nonvolatile memory 118A can be read by a maintenance tool through maintenance interface 116. In some embodiments, a status of the airbag control unit 100, such as the armed status, can be set by a maintenance tool through maintenance interface 116.

In some embodiments, the first nonvolatile memory 118A and the second nonvolatile memory 118B are a single element.

First logic element 114A tests to ensure that the shock 132 detected is a sufficient level shock (e.g., a shock 132 is detected and is identified as a crash-level shock by the first filter 108A, such as by not being filtered out) and that the armed status of the airbag control unit 100 is enabled. If both conditions are met, a first trigger signal 140A is sent to first switch A 120A, first switch B 120B, first switch C 120C, and first switch D 120D. In other embodiments, other numbers of first switches can be used. If one of the conditions are not met, no trigger signal is sent. The first logic element 114A can be an AND gate.

The first logic element 114A, upon receiving a first conditioned signal 138A and when the first armed status of the first nonvolatile memory 118A is enabled, will output a first trigger signal 140A to each first switch 120A, 120B, 120C, 120D. Each first switch 120A, 120B, 120C, 120D can be an electronically-controllable switch, such as a transistor switch, that closes when supplied with a first trigger signal 140A. As used herein, a switch is considered open if it does not pass current and closed if it does pass current. The first trigger signal 140A operates to close first switch 120A, 120B, 120C, 120D. The second logic element 114B, upon receiving a second conditioned signal 138B and when the second armed status of the second nonvolatile memory 118B is enabled, will output a second trigger signal 140B to second switches 124A, 124B, 124C, 124D. Each second switch 124A, 124B, 124C, 124D can be an electronically-controllable switch, such as a transistor switch, that closes when supplied with a second trigger signal 140B. The second trigger signal 140B operates to close the second switches 124A, 124B, 124C, 124D.

The power source 126 can be connected to the trigger outputs 128A, 128B, 128C, 128D, and thus respective airbag inflators 130A, 130B, 130C, 130D. The trigger outputs 128A, 128B, 128C, 128D can be connected to ground 122 through respective first switches 120A, 120B, 120C, 120D and respective second switches 124A, 124B, 124C, 124D. Therefore, when both respective first switches 120A, 120B, 120C, 120D and respective second switches 124A, 124B, 124C, 124D are closed, current is able to pass from the power source 126 to ground 122 through respective airbag inflators 130A, 130B, 130C, 130D, causing the airbags to inflate.

The currents passing from the power source 126, through the trigger outputs 128A, 128B, 128C, 128D, through the respective airbag inflators 130A, 130B, 130C, 130D, through the respective first switches 120A, 120B, 120C, 120D, and through the respective second switches 124A, 124B, 124C, 124D can be high current signals or signals of sufficient current to activate the respective airbag inflators 130A, 130B, 130C, 130D. When the airbag inflators 130A, 130B, 130C, 130D are activated, they inflate one or more airbag cushions. Airbag inflators 130A, 130B, 130C, 130D can be gas powered or other suitable electronically-actuatable inflators.

The power hold element 134 is an electronic buffer that can be charged whenever the first acceleration sensor 104A detects a shock 132 (e.g., a shock 132 that closes the contacts of a shock sensor). The power hold element 134 can be a capacitor. The power hold element 134 is able to provide sufficient power to the various elements of the airbag control unit 100 while the elements evaluate the detected shock 132. For example, the power hold element 134 can provide power to one or more of the first filter 108A, the first signal conditioner 112A, the first nonvolatile memory 118A, and the first logic element 114A, as well as the counterparts in the second trigger control path 102B.

Brown out detectors 136A, 136B can be used to ensure undefined behavior of the airbag control unit 100 does not occur. The brown out detectors 136A, 136B can measure the voltage of the power hold element 134. Each brown out detector 136A, 136B can switch off power supplied to the various elements of its respective trigger control path 102A, 102B if the voltage from the power hold element 134 drops below a predefined limit (e.g., the switching level of the first signal conditioner 112A). The predefined limit can be determined based on the characteristics of the elements receiving the power such that the elements behave as desired. In alternate embodiments, other number of brown out detectors can be used.

In some embodiments, the airbag control unit 100 is magnetically shielded to avoid inadvertent deployment. In some embodiments, only the acceleration sensors 104A, 104B are magnetically shielded.

Figure 2:
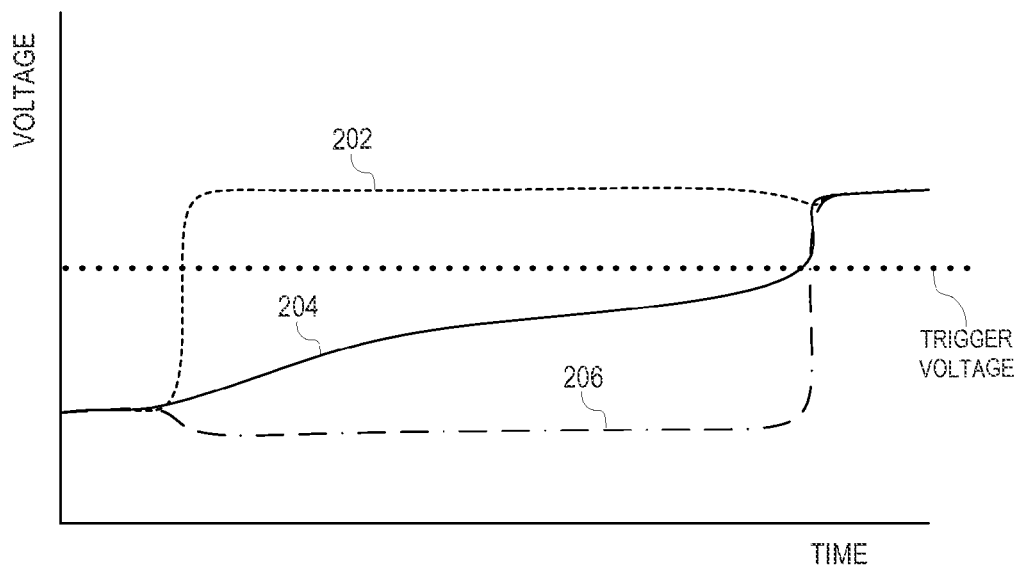
FIG. 2 is a graphical chart showing a shock signal voltage, a filtered signal voltage, and a conditioned signal voltage upon sensing a crash shock according to certain embodiments of the present disclosure.

FIG. 2 is a graphical chart showing a shock signal voltage 202, a filtered signal voltage 204, and a conditioned signal voltage 206 upon sensing a crash shock according to certain embodiments of the present disclosure. The shock signal voltage 202 is the voltage of the output of the first acceleration sensor 104A. Upon sensing a sufficient shock, the first acceleration sensor 104A will begin to pass a high voltage to the first filter 108A.

The filtered signal voltage 204 is the voltage that is output by the first filter 108A upon receiving the shock signal voltage 202. As seen in FIG. 2, the first filter 108A is a low-pass filter, that slowly increases its output voltage in response to a steady high voltage from the first acceleration sensor 104A. During a crash shock, the first acceleration sensor 104A will pass a high voltage to the first filter 108A for a sufficient amount of time such that the output from the first filter 108A reaches a trigger voltage.

The conditioned signal voltage 206 is the output of the first signal conditioner 112A. The first signal conditioner 112A is designed to keep the conditioned signal voltage 206 low until the filtered signal voltage 204 reaches a trigger voltage (e.g., a switching level). Upon receiving a filtered signal voltage at or above the trigger voltage, the first signal conditioner 112A will output a high voltage as its first conditioned signal 138A. In some embodiments, the first signal conditioner 112A is a Schmitt-Trigger circuit. Other suitable signal conditioners may be used that output a high voltage upon receiving a filtered signal voltage 204 at or above a trigger voltage.

The same functionality applies to the elements of the second trigger control path 102B.

Figure 3:
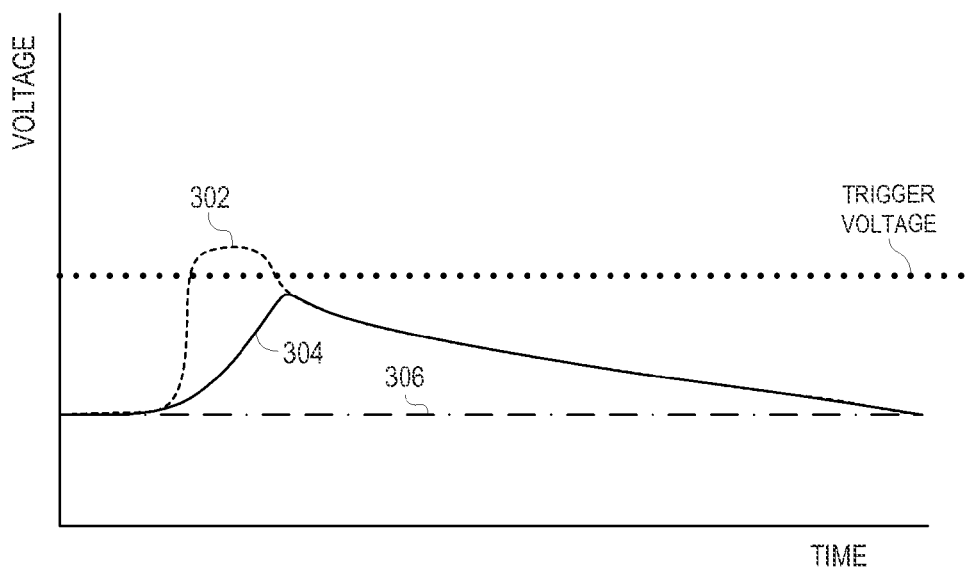
FIG. 3 is a graphical chart showing a shock signal voltage, a filtered signal voltage, and a conditioned signal voltage upon sensing an uncritical shock according to certain embodiments of the present disclosure.

FIG. 3 is a graphical chart showing a shock signal voltage 302, a filtered signal voltage 304, and a conditioned signal voltage 306 upon sensing an uncritical shock (e.g., not a crash-level shock) according to certain embodiments of the present disclosure. The shock signal voltage 302 is the voltage of the output of the first acceleration sensor 104A. Upon sensing an uncritical shock, the first acceleration sensor 104A will begin to pass a high voltage to the first filter 108A, but only for a relatively short amount of time, as compared to when sensing a crash-level shock.

The filtered signal voltage 304 will slowly rise while the output from the first acceleration sensor 104A is high, but because the high shock signal voltage 302 is only sustained for a relatively short amount of time, the filtered signal voltage 304 will never reach the trigger voltage.

Because the filtered signal voltage 304 never reaches the trigger voltage, the conditioned signal voltage 306 will never output a high voltage. Therefore, when an uncritical shock is detected by the first acceleration sensor 104A, the first signal conditioner 112A will not output a first conditioned signal 138A.

The same functionality applies to the elements of the second trigger control path 102B.

Additionally, as seen in FIG. 3, the filtered signal voltage 304 will slowly decrease until it reaches zero or nearly zero. In some embodiments, the first filter 108A includes a discharge circuit that reduces the voltage on the low-pass filter capacitor after detection of an impact.

Figure 4:
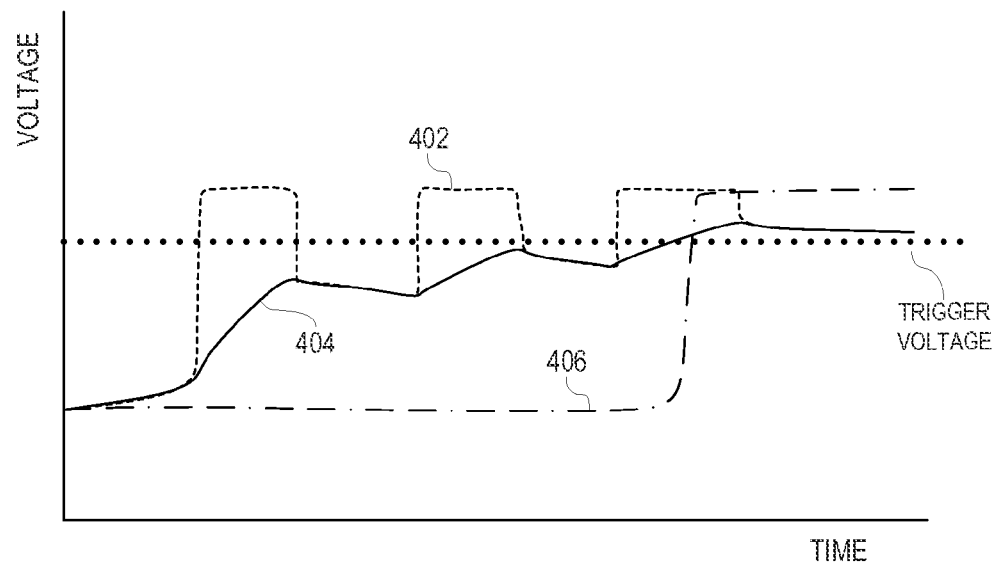
FIG. 4 is a graphical chart showing a shock signal voltage, a filtered signal voltage, and a conditioned signal voltage upon sensing a series of shocks sufficient to indicate a crash-level shock according to certain embodiments of the present disclosure.

FIG. 4 is a graphical chart showing a shock signal voltage 402, a filtered signal voltage 404, and a conditioned signal voltage 406 upon sensing a series of shocks sufficient to indicate a crash-level shock according to certain embodiments of the present disclosure. The shock signal voltage 402 is the voltage of the output of the first acceleration sensor 104A. Upon sensing a series of shocks sufficient to indicate a crash-level shock, the first acceleration sensor 104A will pass multiple, short high voltages to the first filter 108A.

The filtered signal voltage 404 will slowly rise while the output from the first acceleration sensor 104A is high and will slowly lower while the output from the first acceleration sensor 104A is not high. Because the multiple shocks, while each of short duration, are received repeatedly over the course of a small time frame, the filtered signal voltage 404 will slowly rise until it reaches and/or surpasses the trigger voltage.

When the filtered signal voltage 404 reaches the trigger voltage, the conditioned signal voltage 206 will output a high voltage. Therefore, when a series of shocks are detected by the first acceleration sensor 104A within a small time frame, sufficient to indicate a crash situation, the first signal conditioner 112A will output a first conditioned signal 138A.

The same functionality applies to the elements of the second trigger control path 102B.

Figure 5:
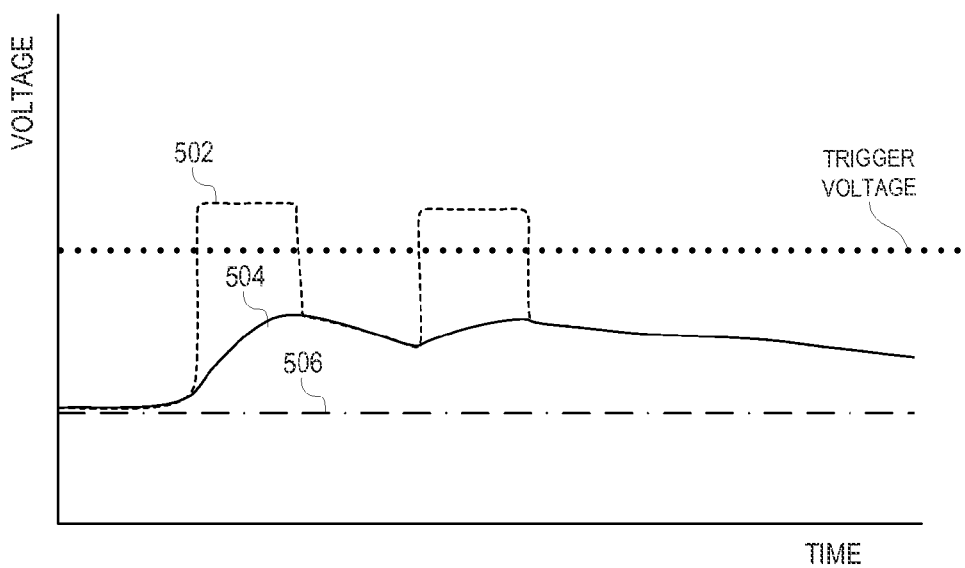
FIG. 5 is a graphical chart showing a shock signal voltage, a filtered signal voltage, and a conditioned signal voltage upon sensing a series of shocks insufficient to indicate a crash-level shock according to certain embodiments of the present disclosure.

FIG. 5 is a graphical chart showing a shock signal voltage 502, a filtered signal voltage 504, and a conditioned signal voltage 506 upon sensing a series of shocks insufficient to indicate a crash-level shock according to certain embodiments of the present disclosure. The shock signal voltage 502 is the voltage of the output of the first acceleration sensor 104A. Upon sensing a series of shocks insufficient to indicate a crash-level shock, the first acceleration sensor 104A will pass multiple, short high voltages to the first filter 108A.

The filtered signal voltage 504 will slowly rise while the output from the first acceleration sensor 104A is high and will slowly lower while the output from the first acceleration sensor 104A is not high. Because the multiple shocks are insufficient to indicate a crash-level shock, the shock signal voltage 502 is insufficient to raise the filtered signal voltage 504 to the trigger voltage.

Because the filtered signal voltage 504 never reaches the trigger voltage, the conditioned signal voltage 506 will never output a high voltage. Therefore, when a series of shocks are detected that are insufficient to indicate a crash situation, the first signal conditioner 112A will not output a first conditioned signal 138A.

The same functionality applies to the elements of the second trigger control path 102B.

In use, the airbag control unit 100 can have one or more trigger outputs 128A, 128B, 128C, 128D that are connected to one or more airbag inflators 130A, 130B, 130C, 130D in any suitable combination. In some embodiments, the airbag control unit 100 includes four trigger outputs 128A, 128B, 128C, 128D each connected to one of four airbag inflators 130A, 130B, 130C, 130D.

Figure 6:
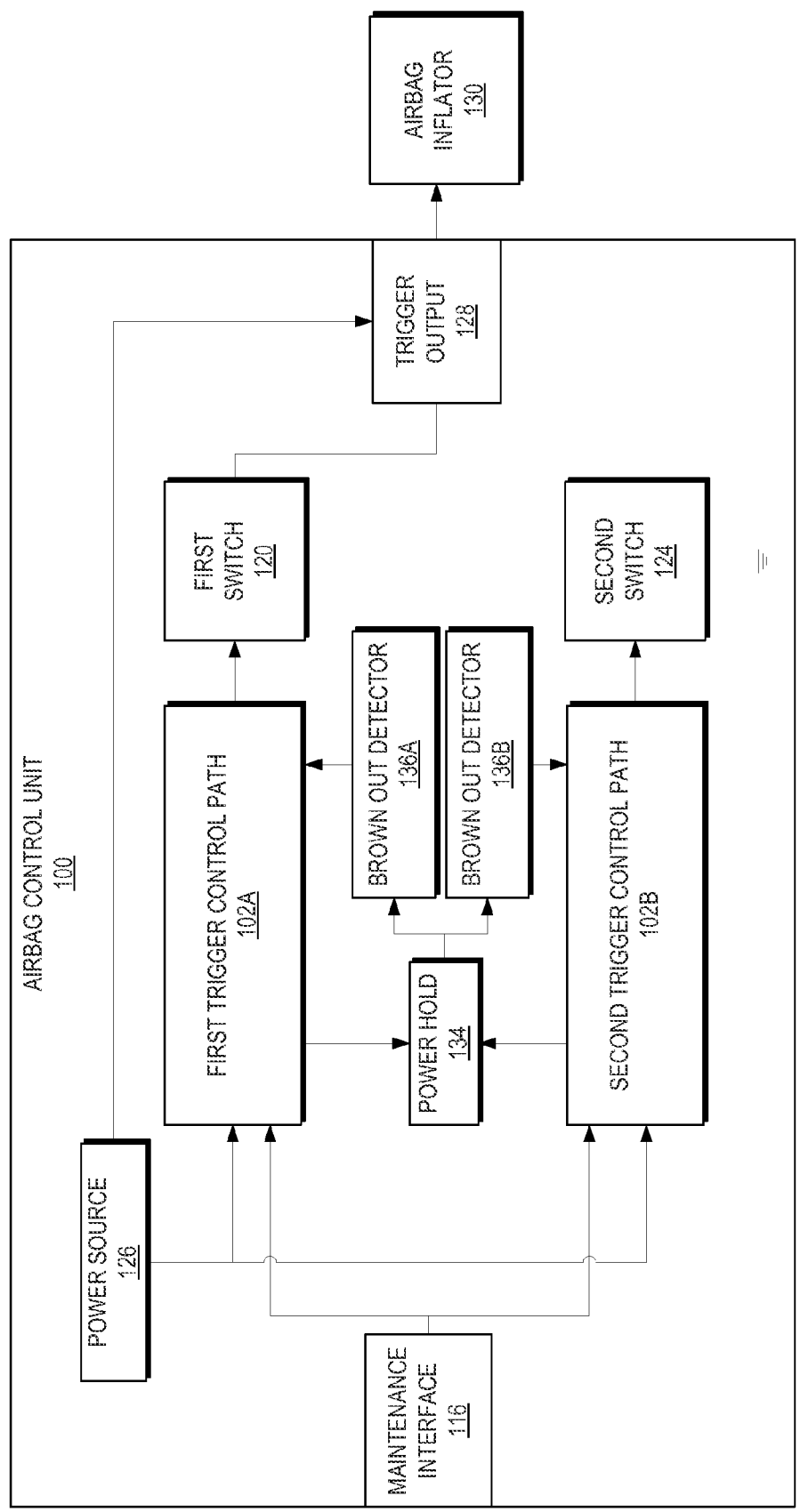
FIG. 6 is a simplified schematic diagram of the airbag control unit of FIG. 1 according to certain embodiments of the present disclosure.

FIG. 6 is a simplified schematic diagram of the airbag control unit 100 of FIG. 1 according to certain embodiments of the present disclosure. In a simplified embodiment, the airbag control unit 100 includes a first trigger control path 102A and a second trigger control path 102B that receive power from a power source 126. Upon sensing a shock by acceleration sensor 104A of the power hold element 134 will receive power. The power hold element 134 stores power for a limited amount of time sufficient to supply power the first trigger control path 102A and second trigger control path 102B to analyze the sensed shock. The power supplied from the power hold element 134 can be detected by first and second brown out detectors 136A, 136B, which cut off power supplied to the first and second trigger control paths 102A, 102B, respectively, if the voltage drops below a minimum set level.

The first trigger control path 102A and second trigger control path 102B each contains an acceleration sensor and circuitry that can analyze a shock. The circuitry in each of the first trigger control path 102A and second trigger control path 102B can be selected to define minimum shock requirements (e.g., intensity, duration, frequency/repetition, and others factors) that define when a shock is considered a crash. A crash-level shock can be defined as any sensed shock intense enough that airbag deployment is desired.

The first trigger control path 102A and second trigger control path 102B can be enabled/disabled through a maintenance interface 116. If the first trigger control path 102A senses a shock that is considered a crash-level shock and it is enabled, the first trigger control path 102A can switch the first switch 120 to allow current to pass therethrough. If the second trigger control path 102B senses a shock that is considered a crash-level shock and it is enabled, the second trigger control path 102B can switch the second switch 124 to allow current to pass therethrough. When both the first trigger control path 102A and second trigger control path 102B are enabled and both sense a shock that is determined to be a crash-level shock, both the first switch 120 and the second switch 124 will be controlled to allow current to pass from the power source 126, through the trigger output 128, through the airbag inflator 130, through the first switch 120, and through the second switch 124 to the ground 122, thus causing inflation of one or more airbags. In alternate embodiments, the first trigger control path 102A and second trigger control path 102B can switch multiple first switches 120 and multiple second switches, respectively, to close circuits between the power supply and one or more trigger outputs 128. Additionally, in some embodiments, each trigger output 128 can be connected to one or more airbag inflators 130.

If either of the first trigger control path 102A or second trigger control path 102B are disabled, such as through the maintenance interface 116, the airbag will not deploy because both the first switch 120 and the second switch 124 will not be controlled to allow current flow therethrough (e.g., because either the first switch 120 or the second switch 124 will not allow current flow therethrough).

In some embodiments, one or both of the first switch 120 and the second switch 124 are transistors. In alternate embodiments, one or both of the first switch 120 and the second switch 124 are other suitable, electronically-controllable switches. In some embodiments, the trigger outputs 128 include one or more outputs. In some embodiments, the airbag inflators 130 include one or more airbag inflators connected in parallel to the trigger outputs 128.

In some embodiments, one first switch and one second switch can be utilized for each trigger output associated with a single airbag inflator. The arrangement of a first switch, a second switch, and a trigger output can be considered an airbag trigger unit. An airbag control unit 100 can include a first trigger control path 120A and a second trigger control path 102B that supply signals to respective first and second switches in any number of airbag trigger units. An airbag control unit 100 can thus trigger any number of airbags, depending on the number of airbag trigger units present in the airbag control unit 100.

In alternate embodiments, additional trigger control paths and additional switches (e.g., third switches) can be used for additional redundancy.

In alternate embodiments, each trigger control path includes independent power hold elements and brown out detectors.

As used herein, the term coupled can include coupling directly or indirectly. The term coupled is inclusive of electronically connecting elements together.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An airbag control unit comprising:
   at least one first switch and at least one second switch coupled in series with at least one trigger output between a power source and a ground;
   a first trigger control path coupled to the power source and having a first nonvolatile memory for storing a first armed status, wherein the first trigger control path is operable to supply a first trigger signal to the at least one first switch in response to sensing a crash-level shock only while the first armed status is enabled, and wherein the at least one first switch is operable to allow current flow therethrough in response to the first trigger signal; and a second trigger control path coupled to the power source and operable to supply a second trigger signal to the at least one second switch in response to sensing the crash-level shock, wherein the at least one second switch is operable to allow current flow therethrough in response to the second trigger signal.

2. The airbag control unit of claim 1 additionally comprising a maintenance interface couplable to a maintenance tool operable to set the first armed status to disabled, wherein the first trigger control path is unable to supply the first trigger signal when the first armed status is disabled.

3. The airbag control unit of claim 1, wherein:
the first trigger control path comprises a first acceleration sensor coupled to the power source, a first filter coupled to the first acceleration sensor, and a first signal conditioner coupled to the first filter; and
the second trigger control path comprises a second acceleration sensor coupled to the power source, a second filter coupled to the second acceleration sensor, and a second signal conditioner coupled to the second filter.

4. The airbag control unit of claim 1, wherein:
the at least one first switch includes four first switches;
the at least one second switch includes four second switches;
the at least one trigger output includes four trigger outputs; and
the four first switches are each coupled in series with respective ones of the four second switches and respective ones of the four trigger outputs between the power source and the ground.

5. The airbag control unit of claim 1, wherein each of the at least one first switch and the at least one second switch is a transistor switch.

6. The airbag control unit of claim 1 additionally comprising a power hold element coupled to the first trigger control path and the second trigger control path for supplying a voltage to the first trigger control path and the second trigger control path for a duration, wherein the first trigger control path and the second trigger control path are further operable to initially supply power to the power hold element in response to sensing an uncritical shock or the crash-level shock.

7. The airbag control unit of claim 6 additionally comprising:
a first brown out detector coupled to the power hold element and the first trigger control path for disabling power to the first trigger control path when the voltage drops below a predetermined limit; and
a second brown out detector coupled to the power hold element and the second trigger control path for disabling power to the second trigger control path when the voltage drops below the predetermined limit.

8. The airbag control unit of claim 1, wherein:
the first trigger control path further comprises a first logic gate coupled to a first accelerometer and the first nonvolatile memory, wherein the first logic gate is operable to supply the first trigger signal only in response the first accelerometer sensing the crash-level shock while the first armed status is enabled; and the second trigger control path further comprises a second nonvolatile memory for storing a second armed status and a second logic gate coupled to a second accelerometer and the second nonvolatile memory, wherein the second logic gate is operable to supply the second trigger signal only in response to receiving a second conditioned signal while the second armed status is enabled.

9. An airbag control unit comprising:
at least one first switch and at least one second switch coupled in series with at least one trigger output between a power source and a ground;
a first trigger control path coupled to the power source and operable to supply a first trigger signal to the at least one first switch in response to sensing a crash-level shock, wherein the at least one first switch is operable to allow current flow therethrough in response to the first trigger signal, wherein the first trigger control path comprises a first acceleration sensor coupled to the power source, a first filter coupled to the first acceleration sensor, and a first signal conditioner coupled to the first filter, wherein the first trigger control path further comprises a first nonvolatile memory for storing a first armed status and a first logic gate coupled to the first signal conditioner and the first nonvolatile memory, and wherein the first logic gate is operable to supply the first trigger signal only in response to receiving a first conditioned signal while the first armed status is enabled; and
a second trigger control path coupled to the power source and operable to supply a second trigger signal to the at least one second switch in response to sensing the crash-level shock, wherein the at least one second switch is operable to allow current flow therethrough in response to the second trigger signal, wherein the second trigger control path comprises a second acceleration sensor coupled to the power source, a second filter coupled to the second acceleration sensor, and a second signal conditioner coupled to the second filter, wherein the second trigger control path further comprises a second nonvolatile memory for storing a second armed status and a second logic gate coupled to the second signal conditioner and the second nonvolatile memory, and wherein the second logic gate is operable to supply the second trigger signal only in response to receiving a second conditioned signal while the second armed status is enabled.

10. The airbag control unit of claim 9 additionally comprising a maintenance interface coupled to the first nonvolatile memory for setting the first armed status and coupled to the second nonvolatile memory for setting the second armed status.

11. A method of triggering an airbag inflator comprising:
providing a first trigger signal in response to sensing a crash-level shock by a first trigger control path, wherein providing the first trigger signal includes reading a first armed status from a first nonvolatile memory, and wherein providing the first trigger signal only occurs when the first armed status is enabled;
providing a second trigger signal in response to sensing the crash-level shock by a second trigger control path, wherein providing the second trigger signal includes reading a second armed status from a second nonvolatile memory, and wherein providing the second trigger signal only occurs when the second armed status is enabled;
outputting a voltage to a trigger output in response to providing the first trigger signal and providing the second trigger signal.

12. The method of claim 11, wherein outputting the voltage further includes closing at least one first switch in response to providing the first trigger signal and closing at least one second switch in response to providing the second trigger signal.

13. The method of claim 12, wherein:
providing the first trigger signal further includes:
generating a first shock signal in response to sensing the crash-level shock by a first acceleration sensor;
filtering the first shock signal to generate a first filtered signal;
conditioning the first filtered signal to generate a first conditioned signal; and
providing the second trigger signal further includes:
generating a second shock signal in response to sensing the crash-level shock by a second acceleration sensor;
filtering the second shock signal to generate a second filtered signal;
conditioning the second filtered signal to generate a second conditioned signal.

14. A method of triggering an airbag inflator comprising:
providing a first trigger signal in response to sensing a crash-level shock by a first trigger control path, wherein providing the first trigger signal includes:
generating a first shock signal in response to sensing the crash-level shock by a first acceleration sensor;
filtering the first shock signal to generate a first filtered signal;
conditioning the first filtered signal to generate a first conditioned signal; and
reading a first armed status from a first nonvolatile memory, wherein
providing the first trigger signal only occurs when the first armed status is enabled;
providing a second trigger signal in response to sensing the crash-level shock by a second trigger control path, wherein providing the second trigger signal includes:
generating a second shock signal in response to sensing the crash-level shock by a second acceleration sensor;
filtering the second shock signal to generate a second filtered signal;
conditioning the second filtered signal to generate a second conditioned signal; and
reading a second armed status from a second nonvolatile memory, wherein providing the second trigger signal only occurs when the second armed status is enabled; and
outputting a voltage to a trigger output in response to providing the first trigger signal and providing the second trigger signal, wherein outputting the voltage further includes closing at least one first switch in response to providing the first trigger signal and closing at least one second switch in response to providing the second trigger signal.

15. The method of claim 11, further comprising:
charging a power hold element in response to sensing a sensed shock selected from the group consisting of an uncritical shock and the crash-level shock; and
supplying power to the first trigger control path and the second trigger control path from the power hold element.

16. The method of claim 15, additionally comprising ceasing to supply power to the first trigger control path and the second trigger control path in response to sensing a supply voltage of the power hold element below a predefined limit.

17. An airbag control unit comprising:
a first acceleration sensor coupled to a first filter which is coupled to a first signal conditioner;
a first AND logic gate coupled to the first signal conditioner and a first nonvolatile memory;
a second acceleration sensor coupled to a second filter which is coupled to a second signal conditioner;
a second AND logic gate coupled to the second signal conditioner and the first nonvolatile memory or a second nonvolatile memory;
a power source coupled to the first acceleration sensor, the second acceleration sensor, and at least one trigger output;
at least one first switch coupled to the first AND logic gate and the at least one trigger output; and
at least one second switch coupled to the at least one first switch, the second AND logic gate, and a ground.

18. The airbag control unit of claim 17, further comprising:
a power hold element coupled to the first acceleration sensor and an analysis element, wherein the analysis element is selected from the group consisting of the first filter and the first signal conditioner.

19. The airbag control unit of claim 18, further comprising:
at least one brown out detector coupled to the power hold element and the analysis element.

20. The airbag control unit of claim 19, further comprising a maintenance interface coupled to the first nonvolatile memory and the second nonvolatile memory, wherein the second AND logic gate is coupled to the second nonvolatile memory.

* * * * *